US012591784B2

(12) United States Patent
Zhang et al.

(10) Patent No.: US 12,591,784 B2
(45) Date of Patent: Mar. 31, 2026

(54) DECISION-MAKING METHOD FOR AGENT ACTION AND RELATED DEVICE

(71) Applicant: HUAWEI TECHNOLOGIES CO., LTD., Shenzhen (CN)

(72) Inventors: Gongzheng Zhang, Hangzhou (CN); Bin Hu, Hangzhou (CN); Chen Xu, Hangzhou (CN); Jian Wang, Hangzhou (CN); Rong Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 710 days.

(21) Appl. No.: 17/964,233

(22) Filed: Oct. 12, 2022

(65) Prior Publication Data

US 2023/0032176 A1     Feb. 2, 2023

Related U.S. Application Data

(63) Continuation of application No. PCT/CN2021/087642, filed on Apr. 16, 2021.

(30) Foreign Application Priority Data

Apr. 17, 2020    (CN) .......................... 202010306503.7

(51) Int. Cl.
*G06N 3/092* (2023.01)
(52) U.S. Cl.
CPC ................................... *G06N 3/092* (2023.01)
(58) Field of Classification Search
None
See application file for complete search history.

(56) References Cited

U.S. PATENT DOCUMENTS 10,977,551 B2 *   4/2021   Van Seijen ........... G06N 5/043
2019/0294966 A1   9/2019   Khan et al.
(Continued)

FOREIGN PATENT DOCUMENTS

CN       104750745 A       7/2015
CN       106964145 A       7/2017
(Continued)

OTHER PUBLICATIONS

Gupta, Jayesh, et al., "Cooperative Multi-agent Control Using Deep Reinforcement Learning", Springer LNAI 10642 (2017), pp. 66-83. (Year: 2017).*

(Continued)

*Primary Examiner* — Scott A. Waldron
(74) *Attorney, Agent, or Firm* — Maier & Maier, PLLC

(57) ABSTRACT

A decision-making method for an agent action and a related device are provided and are used in the field of communication technologies. The method includes: a first agent processes first state information obtained from an environment through a first model, to obtain a first cooperation message; the first agent sends the first cooperation message to at least one second agent; the first agent receives second cooperation message sent by the at least one second agent; the first agent processes the first cooperation message and the second cooperation message through a second model, to obtain a first cooperation action performed by the first agent, where the second cooperation message is sent by the at least one second agent.

15 Claims, 8 Drawing Sheets

(56) References Cited

U.S. PATENT DOCUMENTS

| | | | | |
|---|---|---|---|---|
| 2020/0090074 A1* | 3/2020 | Isele | ..................... | G06N 20/00 |
| 2023/0071293 A1* | 3/2023 | Matsunami | ........... | G06N 20/00 |

FOREIGN PATENT DOCUMENTS

| | | |
|---|---|---|
| CN | 108600379 A | 9/2018 |
| CN | 109416871 A | 3/2019 |
| CN | 109617968 A | 4/2019 |
| CN | 110471297 A | 11/2019 |
| CN | 110991972 A | 4/2020 |

OTHER PUBLICATIONS

Oualhaj et al., "A Decentralized Control of Autonomous Delay Tolerant Networks: Multi Agents Markov Decision Processes Framework", 2018 IEEE International Conference on Communications (ICC), IEEE, May 20, 2018, 6 pages.

Kim et al., "Learning to Schedule Communication in Multi-agent Reinforcement Learning", School of Electrical Engineering, arxiv.org, Cornell University Library, Feb. 5, 2019, 17 pages.

Luong et al., "Applications of Deep Reinforcement Learning in Communications and Networking: A Survey", IEEE Communications Surveys and Tutorials, IEEE, May 14, 2019, vol. 21, No. 4, 42 pages.

Yang et al., "Multi-agent Reinforcement Learning Based Traffic Signal Control For Integrated Urban Network: Survey of State of Art", Application Research of Computers, China Academic Journal Electronic Publishing House, Jun. 2018, vol. 35, No. 6, 6 pages, partial English-language translation.

Tampuu et al., "Multi-agent Cooperation and Competition with Deep Reinforcement Learning", PLOS One, Apr. 5, 2017, 9 pages.

Tong et al., "Design Model for Peer-to-Peer Negotiating Multi-agent System", Journal of Southwest Jiaotong University, China Academic Journal Electronic Publishing House, Apr. 2009, vol. 44, No. 2, 7 pages, with partial English-language translation.

* cited by examiner

DECISION-MAKING METHOD FOR AGENT ACTION AND RELATED DEVICE

CROSS-REFERENCE TO RELATED APPLICATIONS

This application is a continuation of International Application No. PCT/CN2021/087642, filed on Apr. 16, 2021, which claims priority to Chinese Patent Application No. 202010306503.7, filed on Apr. 17, 2020. The disclosures of the aforementioned applications are hereby incorporated by reference in their entireties.

TECHNICAL FIELD

The embodiments relate to the field of communication technologies, a decision-making method for an agent action, and a related device.

BACKGROUND

As communication technologies continuously develop, there are more scenarios in which a plurality of agents may cooperate with each other to complete a task together. The plurality of agents may need to interact with an environment at the same time and complete respective corresponding actions to complete the task, such as, joint scheduling of a plurality of base stations, and multi-vehicle joint formation in automated driving. There is a growing need for multi-agent reinforcement learning. The reinforcement learning means that agents learn by interacting with an environment, make actions to the environment based on a state fed back by the environment, to obtain a reward and obtain knowledge based on a reward mechanism, thereby improving responses of the agents to the environment.

During the multi-agent reinforcement learning, because it is usually difficult for a single agent to observe global state information, the agents need to exchange state information with each other to implement cooperation of a plurality of agents. For mutual communication between the plurality of agents, communication content and a communication method need to be determined. The former provides transmission content, and the later provides a transmission approach. In the conventional technology, an agent usually uses a neural network model to determine communication content. An input of the model is a state of an environment, and outputs of the model are communication information that is transmitted to another network and an execution action of the model. Then, a reward of an entire cooperation task is used as a feedback evaluation of a neural network, and the neural network model is trained based on the evaluation.

Because the communication information does not directly affect completion of the cooperation task, but indirectly affects a reward corresponding to the cooperation task by affecting actions of each agent, so that using a task reward to guide learning of the communication information makes model training more difficult. In addition, outputting information and actions at the same time makes a network scale increase significantly, and a problem that model training is difficult is urgent to be resolved. Moreover, communication overheads are not considered in an objective of reinforcement learning, which may lead to a large dimension of learned communication content, and the large dimension of learned communication content cannot be applicable to an actual communication scenario, especially wireless communication with a limited bandwidth.

SUMMARY

The embodiments may provide a decision-making method for an agent action, to resolve a problem of difficulty in training of a neural network model caused by indirectly determining communication content using a task reward. Influence of communication on an action and a communication dimension are used as a part of a learning objective, to resolve problems of difficulty in communication learning and communication overheads between agents.

According to a first aspect, a decision-making method for an agent action may include:

In a scenario of multi-agent cooperation, a first agent obtains first state information from an environment and processes the obtained first state information through a first model, to obtain a first cooperation message, where the first cooperation message is used to decision-making for an action of the first agent and is communication information transmitted to another agent. Then, the first agent inputs the first cooperation message and a second cooperation message received from the another agent to a second model, to obtain a first cooperation action that needs to be performed by the first agent. In a training process, both the first model and the second model perform learning based on a same task reward. The reward is related to state information obtained by each agent, a cooperation message obtained by each agent, and a finally determined cooperation action corresponding to each agent and is an evaluation of each agent. A plurality of agents may train the first model and the second model based on the evaluation.

The first model may process the first state information to obtain the first cooperation message and then the second model may process the first cooperation message to obtain the first cooperation action, so that an original parallel network model that obtains both a cooperation message and a cooperation action based on state information becomes a serial network model. In addition, the reward is related to a task, and is also related to the state information, the cooperation message, and the cooperation action, so that a structure of each network model is simpler. In addition, the first model and the second model may be directly evaluated through a new reward mechanism, and a neural network model is trained more easily.

Based on the first aspect, the embodiments may further provide a first implementation of the first aspect:

The reward is an evaluation of a result of completing a task for a plurality of agents that are based on the same cooperation task and is an evaluation mechanism related to the task. Therefore, for a task, a higher task completion degree indicates a higher objective achievement degree and a higher reward. In addition, the reward mechanism further needs to include a first reward and a second reward. The first reward is a correlation between the state information and the first cooperation message. The first cooperation message means that the first model screens and compresses the first state information. A lower correlation between the first state message and the first cooperation message indicates that the first model selects the most relevant information and filters out a large amount of information that is irrelevant to the task in the first state information. That is, a lower correlation between the first state information and the first cooperation message indicates a higher first reward.

The first reward may evaluate the first model, and training and learning are performed on the first model based on the fed back first reward, so that the first model may be directly evaluated and the network model is continuously optimized based on the reward.

Based on the first implementation of the first aspect, the embodiments may further provide a second implementation of the first aspect:

The reward may further include the second reward, and the second reward is a correlation between the first cooperation message and both the first cooperation action and a second cooperation action. The first state message, as an input of the first agent and a second model of another agent, guides selection of an agent cooperation action. A higher correlation between the first cooperation message and both the first cooperation action and the second cooperation action indicates a higher second reward, and higher first reward and second reward indicate that the reward is higher.

The reward may need to evaluate the task completion degree and also may evaluate the correlation between the first state information and the first cooperation message and a correlation between the first cooperation message and a cooperation action. Through feedback of this reward mechanism, the network model is continuously optimized, and better first cooperation message, first cooperation action, and second cooperation action may be obtained. That is, the network model may obtain more useful information, namely, the first cooperation message, from the state information, and obtain a best cooperation action of each agent based on the first state information, thereby better completing a cooperation task.

Based on the first aspect to the second implementation of the first aspect, the embodiments may further provide a third implementation of the first aspect:

The state information includes the first state information obtained from the environment by the first agent, and further includes second state information obtained from the environment by another agent. The second state message is used to determine the second cooperation message of the another agent.

Based on the third implementation of the first aspect, the embodiments may further provide a fourth implementation of the first aspect:

In the scenario of multi-agent cooperation, whether the plurality of agents collect state information from the environment is also determined by a task. A collection task is allocated based on an evaluation mechanism. The first agent obtains the first state message from the environment based on an evaluation mechanism of the cooperation task, and the second agent obtains the second state message from the environment based on the same evaluation mechanism. Then, each agent processes the obtained state information to obtain a cooperation message of mutual communication, so that each agent may observe global state information to better cooperate and complete the task.

Based on the first aspect to the fourth implementation of the first aspect, the embodiments may further provide a fifth implementation of the first aspect:

The first agent may further include a screening model. The screening model is located between the first model and the second model and is configured to screen the first cooperation message and the second cooperation message. Before the second model obtains the first cooperation action based on the first cooperation message and the second cooperation message, the screening model processes the first cooperation message and the second cooperation message that are input in the second model, including, for example, deleting redundant information, and modifying error information, so that an input of the second model may be more accurate and concise, and a complexity of intensive training of the second model is reduced.

Based on the first aspect to the fifth implementation of the first aspect, the embodiments may further provide a sixth implementation of the first aspect:

When the two agents communicate with each other to send cooperation messages, the cooperation messages may be transmitted through a communication module. First, the first agent encodes the first cooperation message through the communication module, and then sends the encoded first cooperation message to another agent. Then, the another agent decodes the encoded first cooperation message through the communication model, to obtain the first cooperation message.

During mutual communication and information transmission between general agents, to cope with channel transformation, a redundancy needs to be added to resist interference of a communication medium. If information is transmitted by using a neural network and intensive training is performed on the communication model based on the task, communication content that is more useful for the task may be obtained, and communication efficiency is improved.

A second aspect may provide a first agent, including:

a processing unit, configured to process, through a first model, first state information obtained from an environment, to obtain a first cooperation message; and a sending unit, configured to send the first cooperation message to at least one second agent.

The processing unit is further configured to process the first cooperation message and a second cooperation message through a second model, to obtain a first cooperation action performed by the first agent. The second cooperation message is sent by the at least one second agent.

The first model and the second model are determined based on a same reward. The first cooperation message is further used to determine a second cooperation action that needs to be performed by the at least one second agent. The reward is related to state information, the first cooperation message, the second cooperation action, and the first cooperation action. The state information includes the first state information.

Based on the second aspect, the embodiments may further provide a first implementation of the second aspect:

The reward is an evaluation of task completion degrees of the first agent and the at least one second agent that are based on a same cooperation task, and the reward includes a first reward and/or a second reward. The first reward is a correlation between the state information and the first cooperation message; and a lower correlation between the state information and the first cooperation message indicates a higher first reward.

Based on the first implementation of the second aspect, the embodiments may further provide a second implementation of the second aspect:

The second reward is a correlation of the first cooperation message, the first cooperation action, and the second cooperation action. A higher correlation of the first cooperation message, the first cooperation action, and the second cooperation action indicates a higher second reward.

Based on the second aspect to the second implementation of the second aspect, the embodiments may further provide a third implementation of the second aspect:

The state information further includes second state information, and the second state information is used by the at least one second agent to obtain the second cooperation message based on the second state information.

5

Based on the third implementation of the second aspect, the embodiments may further provide a fourth implementation of the second aspect:

An obtaining unit is configured to obtain the first state information from the environment based on an evaluation mechanism of the cooperation task. The second state information is obtained from the environment, by the at least one second agent, based on the same evaluation mechanism of the cooperation task.

Based on the second aspect to the fourth implementation of the second aspect, the embodiments may further provide a fifth implementation of the second aspect:

A receiving unit is configured to receive the second cooperation message through a screening model. The screening model is configured to screen the second cooperation message based on the first cooperation message.

Based on the second aspect to the fifth implementation of the second aspect, the embodiments may further provide a sixth implementation of the second aspect:

The sending unit may be configured to encode the first cooperation message through a communication model. The sending unit sends the encoded first cooperation message to the at least one second agent, so that the at least one second agent decodes the encoded first cooperation message through the communication model, to obtain the first cooperation message.

A third aspect may provide an agent, including: at least one processor and a memory. The memory stores computer-executable instructions that can be run on the processor. When the computer-executable instructions are executed by the processor, the agent executes the method according to the first aspect or any one of the possible implementations of the first aspect.

A fourth aspect may provide a multi-agent cooperation system, including: a first agent and at least one second agent. The first agent and the at least one second agent execute the method according to the first aspect to any one of the possible implementations of the first aspect.

A fifth aspect may provide a non-transitory computer storage medium. The non-transitory computer storage medium may be configured to store computer software instructions used by the foregoing agent and may include a program designed for executing the agent.

The agent may be the first agent described in the second aspect.

A sixth aspect may provide a chip or a chip system. The chip or the chip system includes at least one processor and a communication interface. The communication interface and the at least one processor are interconnected by using a line, and the at least one processor is configured to run computer programs or instructions, to perform the decision-making method for an agent action described in the first aspect to any one of the possible implementations of the first aspect.

The communication interface in the chip may be an input/output interface, a pin, a circuit, or the like.

In a possible implementation, the chip or chip system may further include at least one memory that may store instructions. The memory may be a storage unit inside the chip, for example, a register or a cache, or may be a storage unit of the chip (for example, a read-only memory or a random access memory).

A seventh aspect may provide a computer program product. The computer program product includes computer software instructions. The computer software instructions may be loaded through a processor to implement the procedures in the decision-making method for an agent action according to any implementation of the first aspect.

The embodiments may have the following advantages:

State information collected in an environment may be processed to obtain a first cooperation message and then the first cooperation message may be processed to obtain a first cooperation action, so that an original parallel network model that obtains both a cooperation message and a cooperation action based on the state information becomes a serial network model. In addition, a reward is related to a task, and is also related to the state information, the cooperation message, and the cooperation action, so that a structure of each network model is simpler. In addition, a first model and a second model may be directly evaluated through a new reward mechanism, thereby reducing a training complexity of a neural network model and improving a completion degree of a cooperation task.

DETAILED DESCRIPTION OF THE EMBODIMENTS

The embodiments may provide a decision-making method for an agent action, to resolve a problem of difficulty in training of a neural network model caused by indirectly determining communication content using a task reward.

The following describes the embodiments with reference to the accompanying drawings. It is clear that the described embodiments are merely a part rather than all of the embodiments.

In the embodiments and the accompanying drawings, terms "first", "second", "third", "fourth", and the like (if existent) are intended to distinguish between similar objects but do not necessarily indicate an order or a sequence. It should be understood that the data used in such a way are interchangeable in appropriate circumstances, so that embodiments described herein can be implemented in an order other than the content illustrated or described herein.

In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

Figure 1:
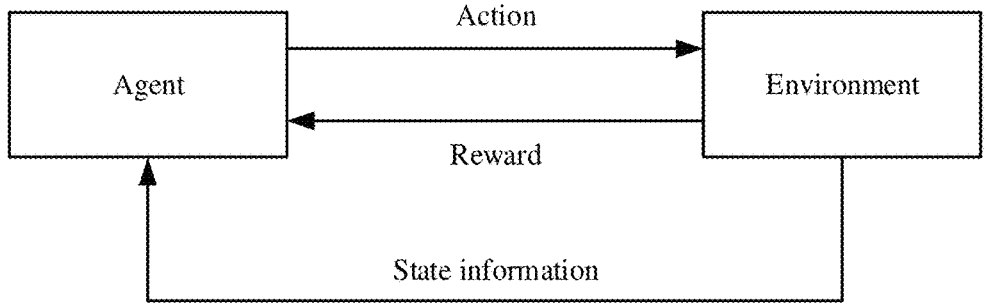
FIG. 1 is a schematic diagram of agent reinforcement learning according to an embodiment.

FIG. 1 is a schematic diagram of agent reinforcement learning according to an embodiment. The reinforcement learning means that an agent performs learning by interacting with an environment. The agent receives state information fed back by the environment, makes an action, and then obtains a reward and a next-moment state. The reward is an evaluation performed on the action based on a task. In a period of time, a larger reward for the agent indicates that the agent performs a better action on an environment state. The agent continuously learns, adjusts actions, and finally obtains knowledge based on the reward to improve an action plan to adapt to the environment.

Figure 2:
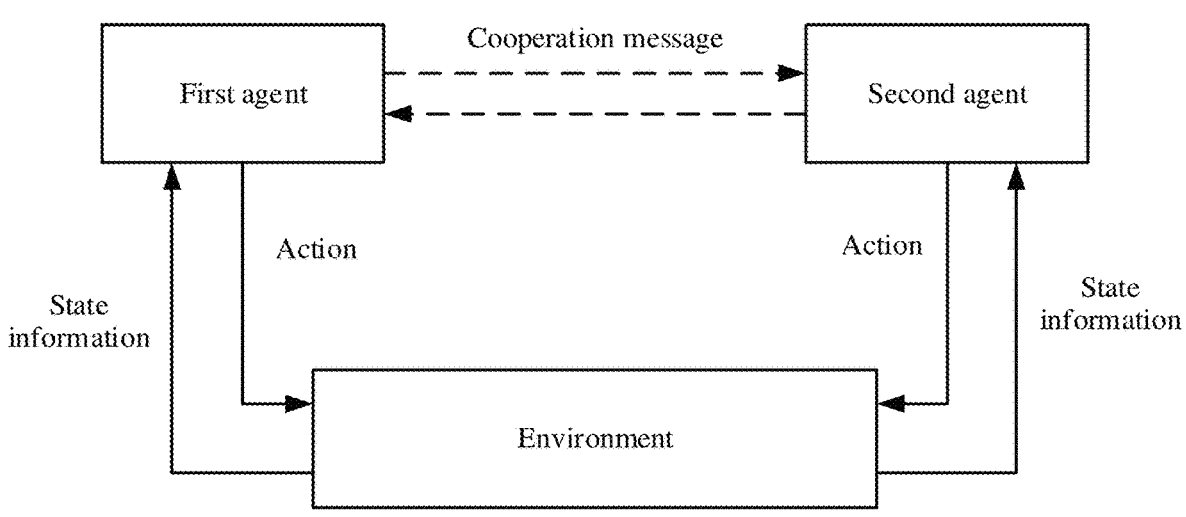
FIG. 2 is a schematic diagram of multi-agent reinforcement learning according to an embodiment.

FIG. 2 is a schematic diagram of multi-agent reinforcement learning according to an embodiment. The multi-agent reinforcement learning means that a plurality of agents may interact with an environment at the same time, and act on an environment state to jointly complete a cooperation task, for example, multi-base station joint scheduling, multi-vehicle joint formation in automated driving, and multi-user joint transmission from one device to another device. It is difficult for a single agent to observe global state information. Therefore, to implement cooperation between a plurality of agents and better complete a task, multi-agent joint learning is required, and the multi-agent joint learning needs to exchange information through communication.

The communication between the plurality of agents needs to resolve problems of transmission content and a transmission manner. A conventional communication manner is that the transmission content and the transmission manner are separately designed. The transmission content usually refers to all states observed by an agent, such as an image or a video collected by a camera of an automated driving vehicle, a channel state of a user of a local cell collected by a base station, and data collected by various sensors. The agent needs to transmit the data to another agent. A communication method is to use a communication architecture of Shannon, including signal source and channel encoding, and the like. The signal source encoding implements compression of a signal source to reduce communication overheads. The channel encoding adds a redundancy to resist interference in a communication medium.

In the communication manner, communication content is not screened for state information observed by a task and a receiving party. A worst case is that a sending party needs to transmit all observed state information to all other agents, and the receiving party needs to receive all state information observed by all the other agents, to ensure that each agent observes a global state and performs a best action. Therefore, the communication content includes a large amount of redundant information, and consequently, communication efficiency is reduced.

Therefore, the plurality of agents may select a learning-based communication manner, each agent may use guidance of a reward in the reinforcement learning to independently learn the communication content required for completing the task and may select the communication content by using a neural network model. The neural network model is trained based on guidance of a task reward.

Figure 3:
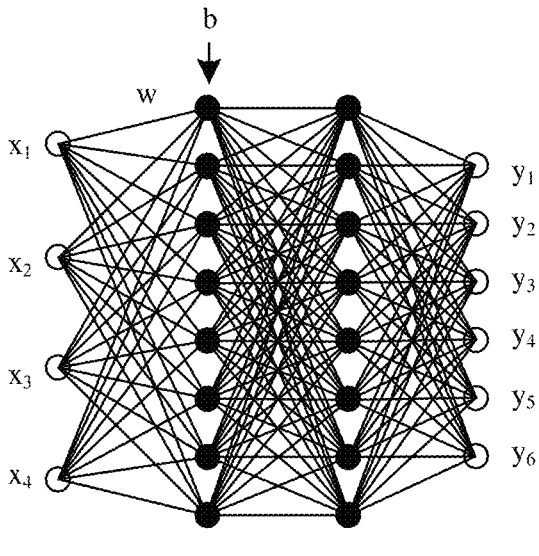
FIG. 3 is a schematic diagram of a structure of a fully connected neural network according to an embodiment.

FIG. 3 is a schematic diagram of a structure of a fully connected neural network. The fully connected neural network.

work is also referred to as a multilayer perceptron (MLP). $x_i$ on the left side of the MLP is an input layer, $y_i$ on the right side is an output layer, and a plurality of layers in the middle are hidden layers. Each layer includes several nodes that are referred to as neurons. The neurons of two adjacent layers are connected to each other. A first layer is used as an example, and each neuron h of a second layer is an output of the first layer. It is deduced in sequence that the last output of the neural network may be recursively expressed as $y=f_n(w_nf_{n-1}( \ldots )-b_n)$ by using a matrix.

w is a weight matrix, b is an offset vector, and f is an activation function. Therefore, in short, a neural network model may be understood as a mapping relationship from an input data set to an output data set. Usually, the neural network model is randomly initialized, and training of the neural network model is a process of continuously optimizing the weight matrix w and the offset vector b. An output result of the neural network may be evaluated by using a loss function and an error may be propagated backwards. w and b are iteratively optimized by using a gradient descent method to reduce the loss function, and then an input is processed by using w and b that are optimized after the training, to obtain an output. The loss function is related to a task and is an evaluation of the task.

In a scenario of multi-agent joint cooperation, a plurality of agents may input, by using the neural network model, state information obtained from an environment, output cooperation actions of the plurality of agents and a cooperation message that is transmitted to another person, evaluate the output by using a reward, and train the neural network model. An objective of reinforcement learning is:

$$\max_{\pi} J(\pi) = I\!E\left[\sum_{t=0}^{\infty} \gamma^t r_t \mid s = s_0, \pi\right]$$

$r_t$ is the reward, $\gamma$ is a discount factor, and $\pi$ is a policy, including a policy of the cooperation actions and a policy of the cooperation message. $\pi(a_i|s_i,m_{-i})$ represents that when a state is $s_i$ and a message received from another agent is $m_{-1}$, an agent executes an action $a_i$. $\pi(m_i|s_i)$ represents that when the state is $s_i$, the agent generates a cooperation message $m_i$ and transmits the cooperation message to another agent. In other words, a reward mechanism guides the neural network to change the output cooperation action and cooperation message. Different outputs obtain different rewards. A larger reward in a period of time indicates that a corresponding cooperation action and corresponding cooperation message are better.

The reward is to evaluate a task completion degree, the cooperation action affects the cooperation action, and the cooperation action directly affects completion of the task. Therefore, the reward indirectly evaluates the cooperation message, and this makes it difficult to learn content of the cooperation message based on the reward. In addition, that the cooperation message and the cooperation action are output in parallel based on the state information causes a significant increase in a scale of the neural network model, which makes training of the neural network model extremely difficult. In another aspect, only rewards are included in the objective of the reinforcement learning, and communication overheads are not considered. This may lead to a large dimension of learned communication content and cannot be applicable to an actual communication scenario.

Figure 4:
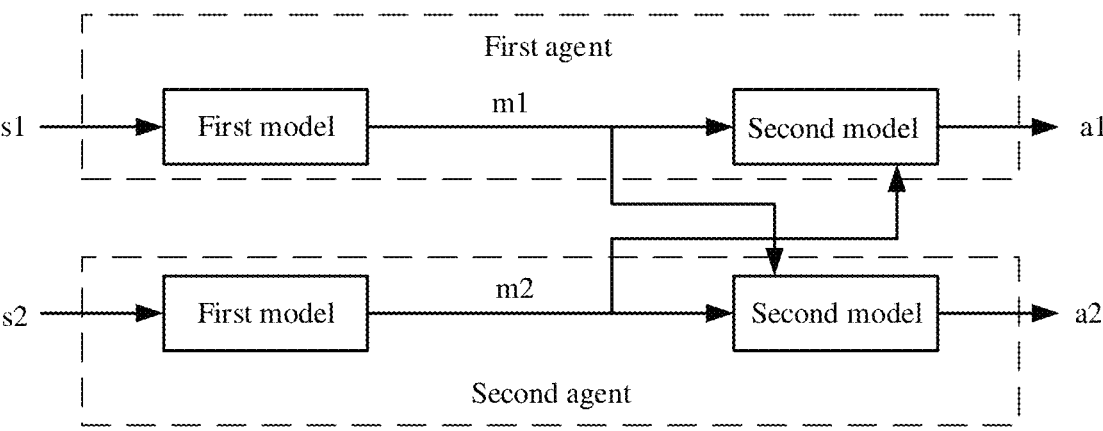
FIG. 4 is a diagram of a network architecture corresponding to a decision-making method for an agent action according to an embodiment.

FIG. 4 is a diagram of a network architecture corresponding to a decision-making method for an agent action according to an embodiment. As shown in FIG. 4, a first agent obtains first state information s1 from an environment and inputs the first state information s1 to a first model of the first agent to generate a first cooperation message m1. A second agent obtains second state information s2 from the environ-ment, inputs the second state information to a first model of the second agent to generate a second cooperation message m2. Then, the first agent receives the second cooperation message m2 sent by the second agent, the first cooperation message m1 and the second cooperation message m2 are used as inputs of a second model corresponding to the first agent, and the second model processes the inputs of the second model to generate a first cooperation action a1. Similarly, the second agent receives the first cooperation message m1 sent by the first agent, and the first cooperation message m1 and the second cooperation message m2 are used as inputs of a second model corresponding to the second agent and processes the inputs of the second model to generate a second cooperation action a2 of the second agent.

Figure 5:
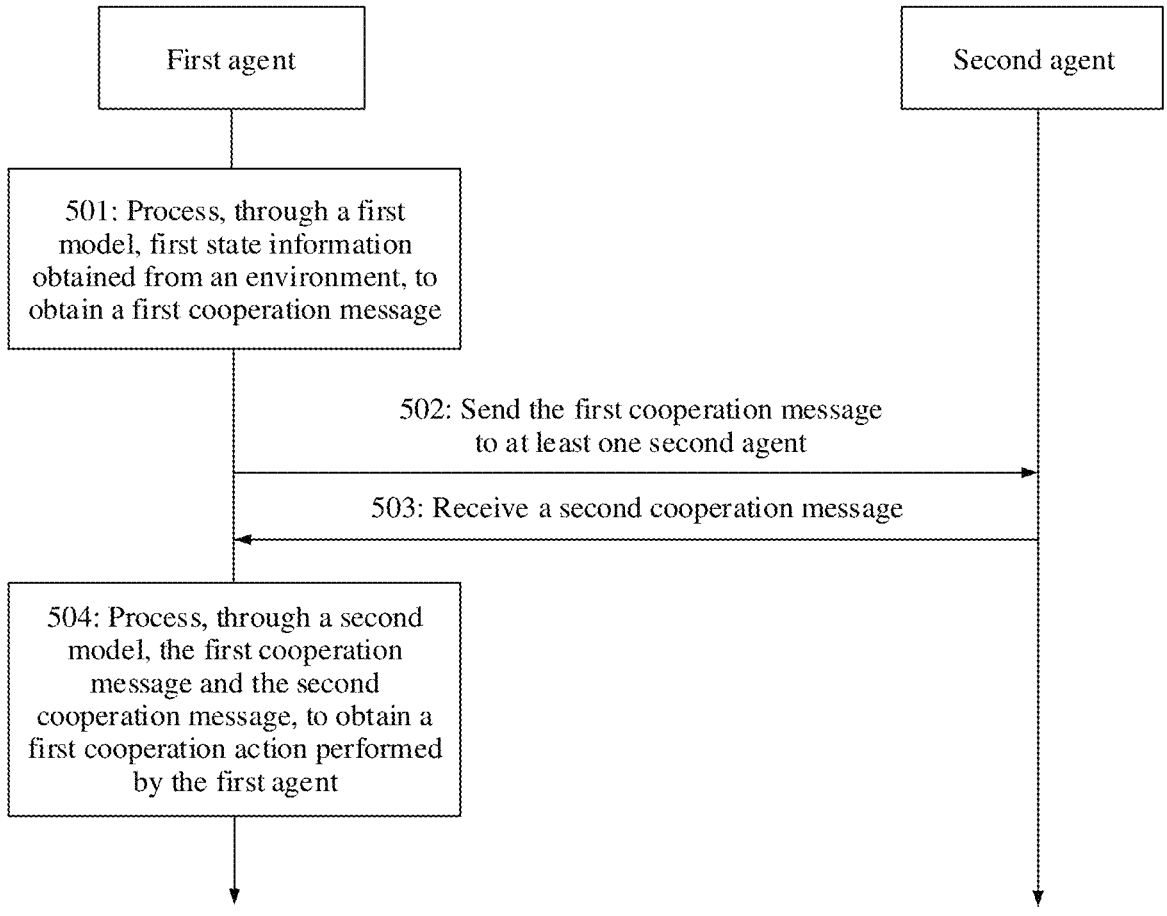
FIG. 5 is a schematic flowchart of a decision-making method for an agent action according to an embodiment.

In this embodiment, a string network structure is used. The first model completes extraction of state information, and extracts information useful for cooperation actions of a plurality of agents from the state information based on a cooperation task, to generate a cooperation message. The cooperation message is used in an action decision of this agent, and is also communication content transmitted to another agent, which affects a cooperation action decision of the another agent. The second model inputs the cooperation message generated by the first model of this agent and a cooperation message sent by the another agent, and outputs the cooperation action that this agent needs to perform. In this case, a structure of each neural network model is simpler, and the first model and the second model may be directly trained by changing a reward mechanism. Method steps are shown in FIG. 5.

501: A first agent processes, through a first model, first state information obtained from an environment, to obtain a first cooperation message.

The state information is an environment feature observed based on a cooperation task. For example, in a cooperation task of multi-vehicle joint formation in automated driving, the state information may be a road condition observed by a vehicle, and an obstacle image observed by the vehicle, or the like. In a cooperation task of multi-user joint transmis-sion from one device to another device, the state information may be a channel resource, a channel loss value, or the like that is obtained by a device. The agent determines an action plan and completes the cooperation task to adapt to the environment. Therefore, the state information needs to be obtained from the environment first.

In a scenario of multi-agent joint cooperation, it is difficult for a single agent to obtain global state information, and a plurality of agents need to jointly obtain state information and interact with each other. Therefore, each agent has a task of observing an environment state. Optionally, the plurality of agents may allocate tasks of obtaining the state informa-tion based on the cooperation task. The first agent may need to obtain the first state information from the environment based on an evaluation mechanism of the cooperation task and a second agent may also need to obtain second state information from the environment based on the same evalu-ation mechanism.

For example, in a scenario of multi-vehicle formation cooperation, when trucks on an expressway are formed, because the expressway usually has a fixed route and fewer obstacles and fewer sudden factors, a task of a truck formation on the expressway is consistent with a moving route of a leading truck, and a distance between every two trucks remains unchanged. Therefore, based on the cooperation task, the evaluation mechanism of the cooperation task may include an evaluation on the distance between every two trucks. Therefore, a state obtained from the environment by the leading vehicle may be road condition information, or the like, and a subsequent vehicle needs to monitor the road condition and also needs to monitor a position of the previous vehicle.

For example, when multi-vehicle formation cooperation is used as automated coordinated driving, complexity and variability of a traffic environment require a vehicle to perceive and calculate a large amount of data, require the vehicle to comprehensively, accurately, and quickly evaluate a real-time traffic environment change, and then make a reasonable action plan. Therefore, based on this evaluation mechanism, each vehicle needs to obtain traffic jam infor-mation from the environment, perceive dynamic conditions of neighboring vehicles and pedestrians, obtain traffic signal light information, perceive a distance between vehicles, determine, based on the task, a range to be monitored by each vehicle, and design a reasonable state information obtaining policy, to reach effects of properly using resources and properly completing the task.

The first agent monitors the environment based on the evaluation mechanism, obtains useful first state information, and then processes the first state information. The first agent may learn, through the first model, information that is in the first state information and that is useful for the task to obtain a first cooperation message. For example, a structure and a dimension of the first model are determined by a data structure of the first state information. For example, if the state information is an image, the first model may be a convolutional network, or if the state information is a channel value, the first model is a fully connected neural network, and a form is not limited. The first cooperation message is used for an action decision of the first agent and is also communication information of mutual communica-tion between the plurality of agents, to facilitate another agent to obtain global state information of the environment, that is, the first cooperation message is also used for an action decision of the second agent.

502: The first agent sends the first cooperation message to at least one second agent.

Figure 4A:
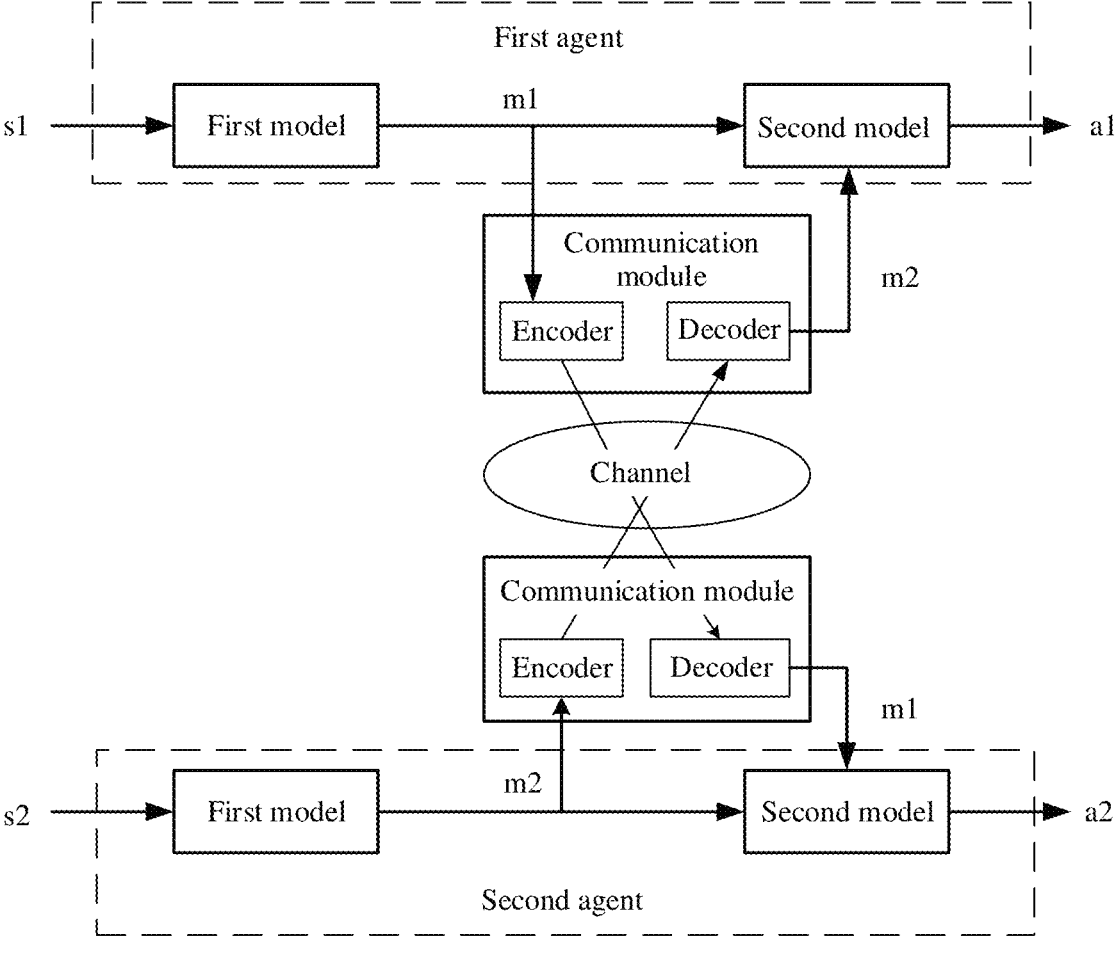
FIG. 4A is a diagram of another network architecture corresponding to a decision-making method for an agent action according to an embodiment.

A second cooperation action of the second agent needs to be determined by the first cooperation message. Therefore, the first agent needs to send the first cooperation message to the second agent. In an implementation, information may be transmitted between the first agent and the second agent through a communication model. FIG. 4A is a diagram of another network architecture corresponding to the decision-making method for an agent action in this embodiment. As shown in FIG. 4A, when the first agent transmits the first cooperation message m1 to the second agent, the first cooperation message m1 is transmitted to a communication model of the first agent first, and then the communication model of the first agent transmits the first cooperation message to a communication model of the second agent through a channel.

As a channel adapter, the communication model may include an encoder and a decoder, to resolve problems such as channel interference and noise. For example, the encoder in the communication model first encodes the first coopera-tion message m1, and then sends the first cooperation message to the second agent. The communication module of the second agent receives the encoded first cooperation message m1, and the decoder in the communication module decodes the first cooperation message m1 to complete data transmission.

The communication module is configured to reduce communication overheads, ensures that the data transmission is authentic and reliable. By using a neural network, new knowledge may be continuously learned, and a coding scheme may be continuously adjusted. The communication module may be jointly trained with the first model and the second model or may be used as an independent network to complete a communication task and be separately trained.

503: The first agent receives a second cooperation message from the at least one second agent.

Figure 4B:
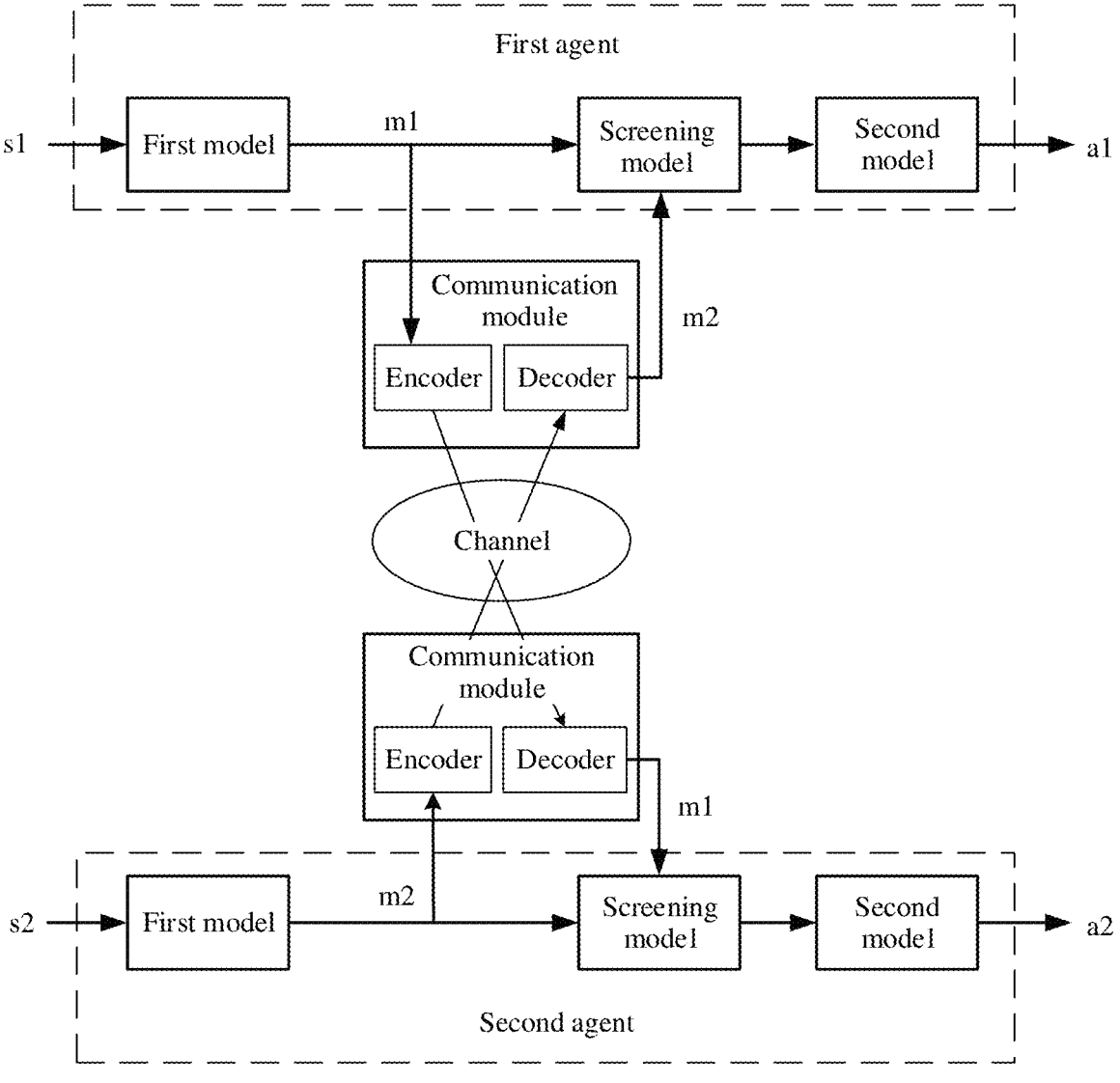
FIG. 4B is a diagram of another network architecture corresponding to a decision-making method for an agent action according to an embodiment.

FIG. 4B is a diagram of another network architecture corresponding to the decision-making method for an agent action in this embodiment. As shown in FIG. 4B, after receiving the second cooperation message sent by the at least one second agent, the first agent needs to process the first cooperation message and the second cooperation message through the second model. Before the first cooperation message and the second cooperation message are transmitted to the second model, the first cooperation message and the second cooperation message may be screened through a screening module, and the screened information is input to the second model.

For example, the screening model may delete duplicate information of the first cooperation message and the second cooperation message and may compare the first cooperation message with the second cooperation message, to correct error information. This is not limited.

It may be understood that there is no sequential relationship between the step 502 and the step 503. The first agent may send the first cooperation message first, and then receive the second cooperation message, or may receive the second cooperation message first, and then send the first cooperation message. A form is not limited.

504: The first agent processes the first cooperation message and the second cooperation message through the second model, to obtain a first cooperation action performed by the first agent.

The second model is configured to make an action decision, determine, by inputting the first cooperation message and the second cooperation message, a cooperation action that the agent needs to complete, then, obtain a reward based on a task evaluation mechanism, and learn new knowledge based on the reward, to constantly adjust the cooperation action; and a maximum reward is finally obtained to determine an action plan of the agent.

The first model and the second model are determined by a same reward. That is, objectives of reinforcement learning of the first model and the second model are consistent, and each may be:

$$\max_{\pi} J(\pi) = I\!E\left[\sum_{t=0}^{\infty} \gamma^t r_t\right] + \alpha I(M; A) - \beta I(S; M)$$

$$I\!E\left[\sum_{t=0}^{\infty} \gamma^t r_t\right]$$

is a task reward; $I(M;A)$ is mutual information between the cooperation message and the cooperation action, and maximizing this mutual information means to extract cooperation message that is most related to the cooperation action from state information; and $I(S;A)$ is mutual information between the cooperation message and the state information, and minimization of this mutual information implements compression of the obtained state information, to remove state information that is not related to the cooperation action.

It may be understood that, in the objectives of the reinforcement learning of the first model and the second model, only the task reward $$I\!E\left[\sum_{t=0}^{\infty} \gamma^t r_t\right]$$

and the mutual information $I(M;A)$ between the cooperation message and the cooperation action may be included, only the task reward $$I\!E\left[\sum_{t=0}^{\infty} \gamma^t r_t\right]$$

and the mutual information $I(S;A)$ between the cooperation message and the state message may be included, or the three may be included. This is not limited.

It may be understood that the reward is related to the state information, the first cooperation message, the second cooperation action, and the first cooperation action, and is an overall evaluation of the state information, the cooperation message, and the cooperation actions. When an agent determines a cooperation action, a system may need to perform evaluation based on a correlation between state information obtained by the agent and the first cooperation message, and a correlation between the first cooperation message and both the first cooperation action and the second cooperation action, to determine a final reward. In a training process, the first model and the second model continuously learn to determine a plurality of action plans. The action plans include obtaining of the state information, generation of the first cooperation message, and determining of the first cooperation action and the second cooperation action. Each action plan corresponds to a reward, and an action plan corresponding to a largest reward determines observation of most effective state information and determines a most useful cooperation message and a most appropriate cooperation action.

It may be understood that the reward is an evaluation of task completion degrees of the first agent and at least one second agent that are based on a same coordination task. A lower correlation between the state information and the first cooperation message indicates a higher reward. A higher correlation of the first cooperation message, the first cooperation action, and the second cooperation action indicates a higher reward.

It may be understood that a function of the first model is to extract information that is most useful to the task from the state information to generate the first cooperation message. The first model may need to complete screening and compression of the state information. When the first model extracts the most effective information, a correlation between the first model and the state information becomes lower. For example, the state information includes information data of ten different aspects, but the first model finally screens out only three pieces of data information that are most relevant to the task. In this case, the first cooperation message may be obtained based on the three pieces of data information. A lower correlation between the first cooperation message and the state information indicates a higher reward. A function of the second model is to obtain a most useful action based on the cooperation message, in other words, a higher correlation between the first cooperation message and both the first cooperation action and the second cooperation action indicates a higher reward.

In this embodiment, the state information collected in the environment is processed to obtain the first cooperation message, and then the first cooperation message is processed to obtain the first cooperation action, so that a parallel network model that originally obtains both a cooperation message and a cooperation action based on the state information becomes a serial network model. In addition, the reward is related to a task, and is also related to the state information, the cooperation message, and the cooperation action, so that a structure of each network model is simpler. In addition, the first model and the second model may be directly evaluated through a new reward mechanism, thereby reducing a training complexity of a neural network model and improving a completion degree of a cooperation task.

The following describes a training process of the first model and the second model.

Figure 6:
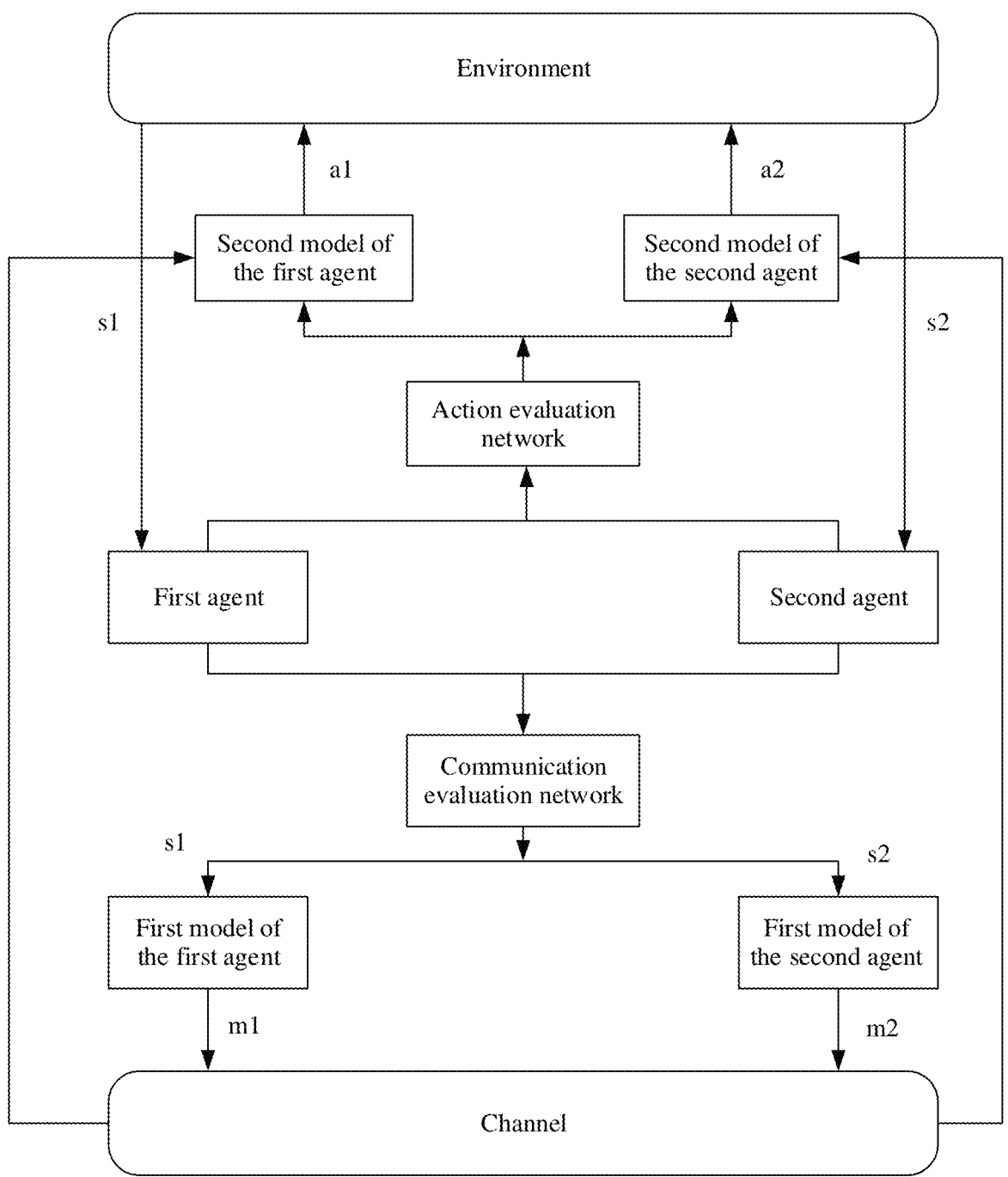
FIG. 6 is a diagram of a training framework corresponding to a first model and a second model according to an embodiment.

FIG. 6 is a diagram of a training framework corresponding to the first model and the second model in this embodiment. As shown in FIG. 6:

The training framework includes a first agent, a second agent, a shared communication evaluation network, a shared action evaluation network, and a first model and a second model of each agent. A training process is as follows:

First, a quantity of iterations is determined based on a task, and network parameters of all networks are initialized. Then, the first agent obtains first state information s1 from an environment, and the second agent obtains first state information s2 from the environment. Then, the first state information s1 is input into the first model of the first agent based on the shared communication evaluation network, and the second state information s2 is input into the first model of the second agent, to separately obtain a first cooperation message m1 and a second cooperation message m2. Then, the first cooperation message m1 and the second cooperation message m2 are transmitted to the shared action evaluation network, and the shared action evaluation network transmits information to the second model of the first agent and the second model of the second agent. The second model of each agent separately processes m1 and m2 to separately obtain a first cooperation action a1 and a second cooperation action a2. Then, a reward is obtained based on a1 and a2, and next-moment state information is also obtained. After a quantity of cycles reaches the quantity of iterations, a total reward is accumulated and calculated, a training model is stored, and then, next training is performed. Finally, a best model is selected from a plurality of training models, to determine a best parameter.

Figures 7, 8:
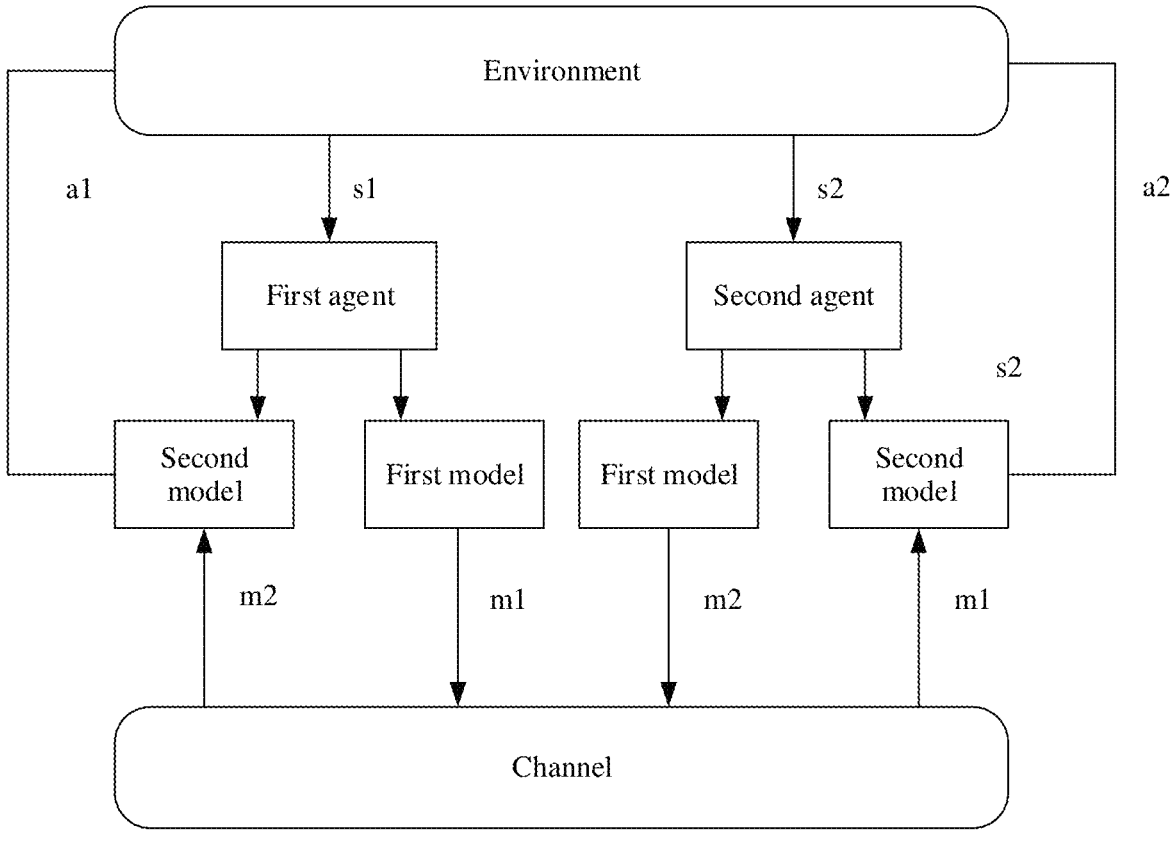
FIG. 7 is a diagram of another training framework corresponding to a first model and a second model according to an embodiment.
FIG. 8 is a schematic diagram of a structure of an agent according to an embodiment.

FIG. 7 is a diagram of another training framework corresponding to the first model and the second model in this embodiment. As shown in FIG. 7:

The training framework includes a first agent, a second agent, and a first model and a second model of each agent. A training process is as follows:

First, a quantity of iterations is determined based on a task, and network parameters of all networks are initialized. Then, the first agent obtains first state information s1 from an environment, and the second agent obtains first state information s2 from the environment. Then, the first state information s1 is input into the first model of the first agent, and the second state information s2 is input into the first model of the second agent, to separately obtain a first cooperation message m1 and a second cooperation message m2. Then, the first agent inputs the first cooperation message m1 to the second model of the first agent and the second agent, and the second agent transmits the second cooperation message m2 to the second model of the second agent and the first agent. The second model of the first agent separately processes m1 and m2 to obtain a first cooperation action a1, and the second model of the second agent separately processes m1 and m2 to obtain a second cooperation action a2. Then, a reward is obtained based on a1 and a2, and next-moment state information is also obtained. After a quantity of cycles reaches the quantity of iterations, a total reward is accumulated and calculated, a training model is stored, and then, next training is performed. Finally, a best model is selected from a plurality of training models, to determine a best parameter.

FIG. 8 is a schematic diagram of a structure of a first agent according to an embodiment. As shown in FIG. 8, the first agent 800 includes:

a processing unit 801, configured to process, through a first model, first state information obtained from an environment, to obtain a first cooperation message; and a sending unit 802, configured to send the first cooperation message to at least one second agent.

The processing unit 801 is further configured to process the first cooperation message and a second cooperation message through a second model, to obtain a first cooperation action performed by the first agent. The second cooperation message is sent by the at least one second agent.

The first model and the second model are determined based on a same reward. The first cooperation message is further used to determine a second cooperation action that needs to be performed by the at least one second agent. The reward is related to state information, the first cooperation message, the second cooperation action, and the first cooperation action. The state information includes the first state information.

In a possible implementation, the reward is an evaluation of task completion degrees of the first agent 800 and the at least one second agent that are based on a same cooperation task, and the reward includes a first reward and/or a second reward. The first reward is a correlation between the state information and the first cooperation message; and a lower correlation between the state information and the first cooperation message indicates a higher first reward.

In a possible implementation, the second reward is a correlation of the first cooperation message, the first cooperation action, and the second cooperation action. A higher correlation of the first cooperation message, the first cooperation action, and the second cooperation action indicates a higher second reward.

In a possible implementation, the state information further includes second state information, and the second state information is used by the at least one second agent to obtain the second cooperation message based on the second state information.

In a possible implementation, the first agent 800 further includes an obtaining unit 803.

The obtaining unit 803 is configured to obtain the first state information from the environment based on an evaluation mechanism of the cooperation task. The second state information is obtained from the environment, by the at least one second agent, based on the same evaluation mechanism of the cooperation task.

In a possible implementation, the first agent further includes a receiving unit 804.

The first receiving unit 804 is configured to receive the second cooperation message through a screening model. The screening model is configured to screen the second cooperation message based on the first cooperation message.

In a possible implementation, the sending unit 802 may be configured to encode the first cooperation message through a communication model. The sending unit 802 sends the encoded first cooperation message to the at least one second agent, so that the at least one second agent decodes the encoded first cooperation message through the communication model, to obtain the first cooperation message.

For a function of each unit of the first agent 800, refer to the implementation details of the first agent in the foregoing method embodiment shown in FIG. 5. Details are not described herein.

Figure 9:
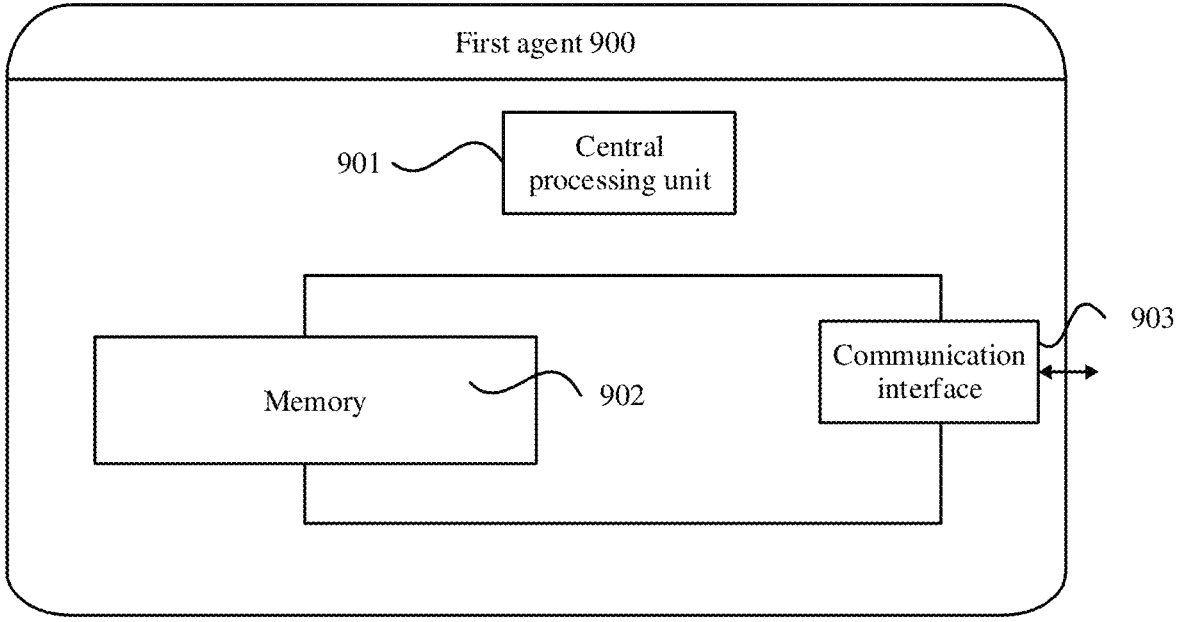
FIG. 9 is a schematic diagram of a structure of another agent according to an embodiment.

FIG. 9 is a schematic diagram of a structure of another first agent according to an embodiment. The first agent 900 includes: a central processing unit 901, a memory 902, and a communication interface 903.

The central processing unit 901, the memory 902, and the communication interface 903 are connected to each other by using a bus. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The memory 902 may include a volatile memory, or a random-access memory (=RAM). The memory may alternatively include a non-volatile memory, a flash memory, a hard disk drive (HDD), or a solid-state drive (SSD). The memory 602 may further include a combination of the foregoing types of memories.

The central processing unit 901 may be a central processing unit (CPU), a network processor (NP), or a combination of a CPU and an NP. The central processing unit 901 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

The communication interface 903 may be a wired communication interface, a wireless communication interface, or a combination thereof, where the wired communication interface may be, for example, an Ethernet interface. The Ethernet interface may be an optical interface, an electrical interface, or a combination thereof. The wireless communication interface may be a WLAN interface, a cellular network communication interface, a combination thereof, or the like.

Optionally, the memory 902 may be further configured to store program instructions. The central processing unit 901 invokes the program instructions stored in the memory 902 to perform one or more steps or an optional implementation in the method embodiment shown in FIG. 5, so that the first agent 900 implements a function of the agent in the foregoing method. Details are not described herein.

An embodiment may further provide a multi-agent cooperation system, including: a first agent and at least one second agent. The first agent and the at least one second agent perform the foregoing decision-making method for an agent action shown in FIG. 5.

An embodiment may further provide a chip or a chip system. The chip or the chip system includes at least one processor and a communication interface. The communication interface and the at least one processor are interconnected by using a line. The at least one processor runs instructions or a computer program to perform one or more steps or an optional implementation in the method embodiment shown in FIG. 5, to implement a function of the agent in the foregoing method.

The communication interface in the chip may be an input/output interface, a pin, a circuit, or the like.

In a possible implementation, the chip or chip system described above further includes at least one memory, and the at least one memory stores instructions. The memory may be a storage unit inside the chip, for example, a register or a cache, or may be a storage unit of the chip (for example, a read-only memory or a random access memory).

An embodiment may further provide a non-transitory computer storage medium that may store computer program instructions for implementing a function of an agent in the decision-making method for an agent action provided in the embodiments.

An embodiment may further provide a computer program product, and the computer program product includes computer software instructions. The computer software instructions may be loaded through a processor to implement the procedures in the decision-making method for an action shown in FIG. 5.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, all or some of the procedures or functions are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by persons skilled in the art that, for the purpose of convenient and brief description, for a detailed working process of the foregoing system, apparatus, and unit, refer to a corresponding process in the foregoing method embodiment. Details are not described herein again.

In the several embodiments, it should be understood that the system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, each of the units may exist alone physically, or two or more units may be integrated into one unit. The integrated unit may be implemented in a form of hardware or may be implemented in a form of a software function unit.

When the integrated unit is implemented in the form of a software functional unit and sold or used as an independent product, the integrated unit may be stored in a computer-readable storage medium. Based on such an understanding, the embodiments essentially, or the part contributing to the prior art, or all or some of the solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

What is claimed is:

1. A decision-making method for an agent action, comprising:

processing, by a first agent through a first model, said first model comprising a first neural network, first state information obtained from an environment, to obtain a first cooperation message, and sending the first cooperation message from the first agent to at least one second agent; and processing, by the first agent through a second model, said second model comprising a second neural network, the first cooperation message and a second cooperation message, to obtain a first cooperation action that needs to be performed by the first agent, and the second cooperation message is sent by the at least one second agent and received by the first agent, wherein the decision-making method further comprises continuously optimizing the first model and the second model via steps of reward-based evaluation and training, the steps of reward-based evaluation and training comprising at least initializing the first model with a first weight matrix and first offset vector and initializing the second model with a second weight matrix and second offset vector, and then performing a number of steps equal to a predetermined number of iterations, wherein each step after a first step comprises altering one or more of the first weight matrix, first offset vector, second weight matrix, and second offset vector based on a fed back reward from a previous step, and evaluating, for said step after the first step, a new first cooperation message and a new second cooperation message to determine a new reward;

the first model and the second model are determined based on a same reward;

the first cooperation message is further used to determine a second cooperation action that needs to be performed by the at least one second agent;

the reward is related to state information, the first cooperation message, the second cooperation action, and the first cooperation action; and the state information comprises the first state information.

2. The decision-making method according to claim 1, wherein the reward is an evaluation of task completion degrees of the first agent and the at least one second agent that are based on a same cooperation task, the reward comprises at least one of a first reward or a second reward, and the first reward is a correlation between the state information and the first cooperation message; and a lower correlation between the state information and the first cooperation message indicates a higher first reward.

3. The decision-making method according to claim 2, wherein the second reward is a correlation between the first cooperation message, the first cooperation action, and the second cooperation action; and a higher correlation between the first cooperation message, the first cooperation action, and the second cooperation action indicates a higher second reward.

4. The decision-making method according to claim 1, wherein the state information further comprises second state information, and the second state information is used by the at least one second agent to obtain the second cooperation message based on the second state information.

5. The decision-making method according to claim 4, further comprising:

obtaining, by the first agent, the first state information from the environment based on an evaluation mechanism of the cooperation task; and the second state information is obtained, from the environment, by the at least one second agent, based on the same evaluation mechanism of the cooperation task.

6. The decision-making method according to claim 1, wherein before the processing, by the first agent through the second model, the first cooperation message and the second cooperation message, the method further comprises:

receiving, by the first agent through a screening model, the second cooperation message, wherein the screening model is configured to screen the second cooperation message based on the first cooperation message.

7. The decision-making method according to claim 1, wherein sending, by the first agent, the first cooperation message to the at least one second agent further comprises:

encoding, by the first agent, the first cooperation message through a communication model; and sending, by the first agent, the encoded first cooperation message to the at least one second agent, so that the at least one second agent decodes the encoded first cooperation message through the communication model, to obtain the first cooperation message.

8. A non-transitory computer-readable storage medium storing one or more computer executable instructions, wherein when the computer-executable instructions are executed by a processor, the processor performs the method according to claim 1.

9. A first agent comprising:

a processing unit, configured to process, through a first model comprising a first neural network, first state information obtained from an environment, to obtain a first cooperation message, and a sending unit, configured to send the first cooperation message from the first agent to at least one second agent;

the processing unit is further configured to process the first cooperation message and a second cooperation message through a second model comprising a second neural network, to obtain a first cooperation action performed by the first agent, and the second cooperation message is sent by the at least one second agent and received by the first agent;

wherein the processing unit is further configured to continuously optimize the first model and the second model via steps of reward-based evaluation and training, the steps of reward-based evaluation and training comprising at least initializing the first model with a first weight matrix and first offset vector and initializing the second model with a second weight matrix and second offset vector, and then performing a number of steps equal to a predetermined number of iterations, wherein each step after a first step comprises altering one or more of the first weight matrix, first offset vector, second weight matrix, and second offset vector based on a fed back reward from a previous step, and evaluating, for said step after the first step, a new first cooperation message and a new second cooperation message to determine a new reward;

wherein the first model and the second model are determined based on a same reward;

wherein the first cooperation message is further used to determine a second cooperation action that needs to be performed by the at least one second agent;

wherein the reward is related to state information, the first cooperation message, the second cooperation action, and the first cooperation action; and wherein the state information comprises the first state information.

10. The first agent according to claim 9, wherein the reward is an evaluation of task completion degrees of the first agent and the at least one second agent that are based on a same cooperation task, the reward comprises at least one of a first reward or a second reward, and the first reward is a correlation between the state information and the first cooperation message; and a lower correlation between the state information and the first cooperation message indicates a higher first reward.

11. The first agent according to claim 10, wherein the second reward is a correlation between the first cooperation message, the first cooperation action, and the second cooperation action; and a higher correlation between the first cooperation message, the first cooperation action, and the second cooperation action indicates a higher second reward.

12. The first agent according to claim 9, wherein the state information further comprises second state information, and the second state information is used by the at least one second agent to obtain the second cooperation message based on the second state information.

13. The first agent according to claim 12, wherein the first agent further comprises:

an obtaining unit configured to obtain the first state information from the environment based on an evaluation mechanism of the cooperation task, and the second state information is obtained from the environment, by the at least one second agent, based on the same evaluation mechanism of the cooperation task.

14. The first agent according to claim 9, wherein the first agent further comprises:

a receiving unit configured to receive the second cooperation message through a screening model, wherein the screening model is configured to screen the second cooperation message based on the first cooperation message.

15. The first agent according to claim 9, wherein the sending unit is further configured to:

encode the first cooperation message through a communication model; and send the encoded first cooperation message to the at least one second agent, so that the at least one second agent decodes the encoded first cooperation message through the communication model, to obtain the first cooperation message.

* * * * *